P. J. WEIRICH.
VEHICLE WHEEL.
APPLICATION FILED JAN. 31, 1921.
1,436,841.
Patented Nov. 28, 1922.
2 SHEETS—SHEET 1.
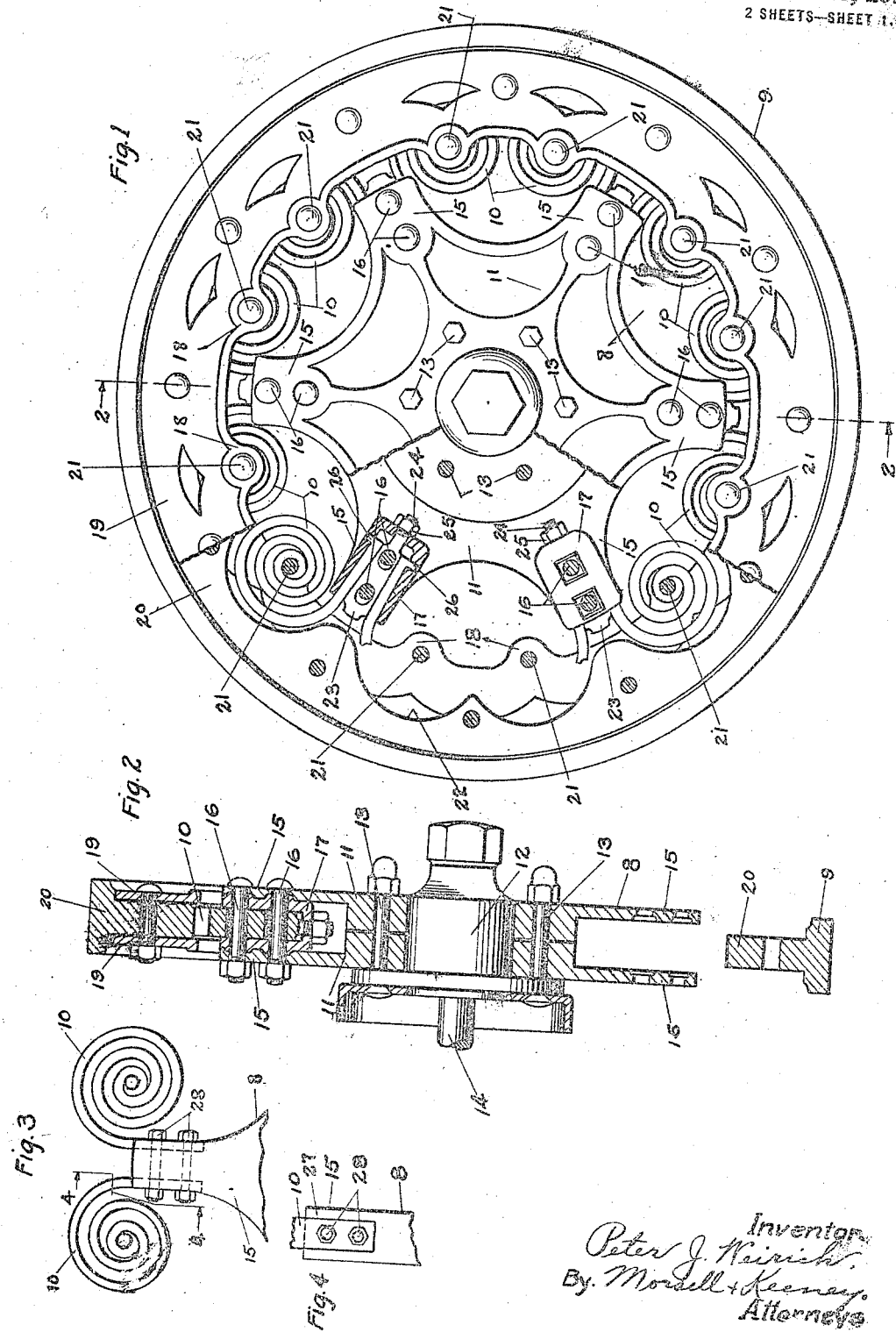
Inventor
Peter J. Weirich
By Morsell & Keeney,
Attorneys

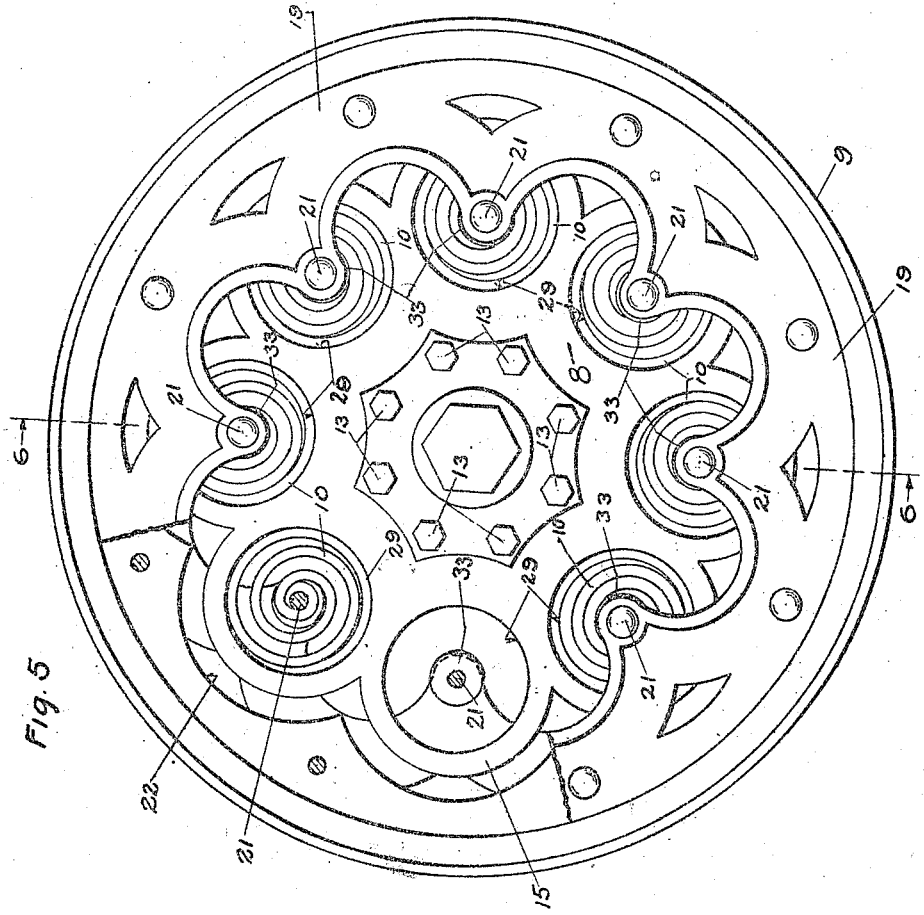
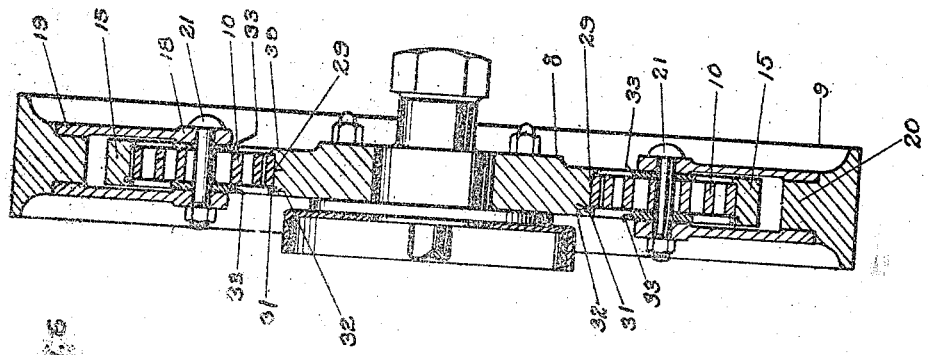

Patented Nov. 28, 1922.

1,436,841

UNITED STATES PATENT OFFICE.

PETER J. WEIRICH, OF ADAMS, WISCONSIN.

VEHICLE WHEEL.

Application filed January 31, 1921. Serial No. 441,264.

*To all whom it may concern:*

Be it known that I, PETER J. WEIRICH, a citizen of the United States, and resident of Adams, in the county of Adams and State of Wisconsin, have invented new and useful Improvements in Vehicle Wheels, of which the following is a description, reference being had to the accompanying drawings, which are a part of this specification.

This invention relates to certain new and useful improvements in vehicle wheels, and has for one of its objects to provide means within the wheel for absorbing shocks imparted thereto whereby, if desired, the usual resilient tire may be dispensed with.

Another object of this invention is to provide a vehicle wheel of two parts connected together by a plurality of shock absorbing means whereby upon a sudden throwing in of the clutch of the vehicle the strain on the gears will be relieved due to said shock absorbing means yieldably resisting any circumferential movement of said sections with respect to each other.

A further object of this invention is to provide an improved form of cushion means whereby all movements of the wheel parts with respect to each other, excepting sidewise movements, will be yieldably resisted by coil spring means connecting the several parts of the wheel.

A still further object of this invention is to provide a vehicle wheel so constructed that all shocks or blows imparted thereto by any unevenness in the road's surface will be absorbed by the wheel and thus relieve the resulting strain from the vehicle, also to provide a wheel which may be constructed with ease and at a comparatively low cost with all of the parts thereof readily accessible for the purpose of repair or replacement, and which may be attached to trucks or other vehicles without marring the appearance thereof.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of a vehicle wheel embodying my invention, parts thereof being broken away and in section to more clearly illustrate structural details;

Figure 2 is a view part in section and part in elevation, with parts removed, and looking on the plane of line 2—2 of Figure 1;

Figure 3 is a fragmentary detail view illustrating a slightly modified manner of connecting the shock absorbing springs with the inner wheel section;

Figure 4 is a fragmentary detail view looking on the plane of line 4—4 of Figure 3;

Figure 5 is a view similar to Figure 1 of a slightly modified form of my invention; and Figure 6 is a sectional view taken through Figure 5 on the line 6—6.

Referring now more particularly to the accompanying drawings, in which like reference characters designate like parts throughout the several views:

My improved wheel consists primarily of two parts or sections, an inner section or body portion 8, and an outer section or tread carrying member 9, the sections being connected together by a plurality of shock absorbing devices in the form of coil springs 10. The inner section, in Figures 1 and 2, is depicted as formed of two complementary plates 11 secured together, and upon a suitable hub 12, by fastening bolts 13, the hub 12 being securable to a supporting axle 14.

The plates 11 are formed with adjacent radially extending arm portions 15 between which are secured, by fastening bolts 16, cup members 17, said cup members having their closed ends positioned inwardly and their open ends receiving the outer ends of the adjacent springs 10. Said springs 10 are arranged in pairs and extend in opposite directions with their outer adjacent ends secured within the cup member 17 therebetween and their inner ends secured between opposed inwardly extending arms 18 formed on two complementary annular plate members 19 secured to a central annular rib 20 formed on the inner periphery of the outer section 9. The adjacent arms of the plates 19 are connected by rods or bolts 21 to which the inner ends of the springs 10 are connected, and the flange or rib 20 is recessed adjacent each spring 10, as at 22, to provide a pocket for receiving the same.

The outer ends of each pair of springs 10 are detachably secured in the adjacent cup member 17 by a wedge member 23 slidably mounted between the spring ends and having an inner threaded shank 24 passed through an opening in the closed wall of the cap member to receive a binding nut 25 for tightly wedging member 23 in position to bind the spring ends between it and the cup member walls. In order to insure the positive securement of the spring ends in the cap members, their inner ends are directed laterally, as at 26, and project into openings in the cap member walls, see Figure 1.

In Figures 3 and 4, the inner section of the wheel is illustrated as preferably formed in one piece with the radial arms 15 thereof slotted, as at 27, on opposed sides to receive the spring ends which are secured in place by fastening bolts 28.

In Figures 5 and 6, I have illustrated a slightly modified form of my invention, in which the inner section 8 is formed in one piece and has the radial arms 15 thereof apertured, as at 29, to bodily receive the coil springs 10 which have their inner ends secured to the bolts 21 connecting the adjacent arms 18 of the plates 19. Each spring 10 has one side of its outer coil abutting an annular flange or rib 30 and the other side thereof abutting a split L-shaped ring 31 secured in a groove 32 at the other side of the aperture whereby said spring is removably secured in place. Each bolt 21 has a pair of washers 33 thereon which engage the adjacent sides of the spring 20.

In both the forms of my invention, the plates 19 prevent the sidewise movement of the inner and outer wheel sections with respect to each other and the springs 10 yieldably resist any circumferential movements of said sections with respect to each other and also any radial movements thereof.

What I claim as my invention is:

1. A resilient wheel comprising an inner hub member provided with outwardly extending radial arms; an outer tread member provided with inward radial extensions and with sockets positioned intermediate said arms; and spiral spring members having their outer ends connected to said arms and their inner ends connected to said extensions, the body portions of said springs occupying said sockets.

2. A resilient wheel comprising an inner hub member having outwardly extending radial arms provided with recesses; an outer tread member provided with inward radial extensions and with sockets positioned intermediate said arms; spiral spring members having their outer ends fitting in said recesses and their inner ends connected to said extensions, the body portions of said springs occupying said sockets; and means for securing the outer ends of said springs in said recesses.

3. A resillient wheel comprising an inner hub member having outwardly extending radial arms provided with recesses; an outer tread member provided with inward radial extensions and with sockets positioned intermediate said arms; spiral spring members having their outer ends fitting in said recesses and ther inner ends connected to said extensions, the body portions of said springs occupying said sockets; and a readily removable wedge member secured within said recesses, adapted to force said outer spring ends against the walls of said recesses.

4. A wheel comprising an inner section, an outer tread carrying section, radially extended arms provided with recesses carried by the inner section, inwardly extended arms carried by said outer section, and a pair of coil springs having their outer ends detachably secured in the recess of each inner section arm and extending in opposite directions with their inner ends connected with the adjacent arms of said outer section.

In testimony whereof, I affix my signature.

PETER J. WEIRICH.